US012603002B2

(12) United States Patent
Jeong et al.

(10) Patent No.: US 12,603,002 B2
(45) Date of Patent: Apr. 14, 2026

(54) METHOD AND SYSTEM FOR PROVIDING PARKING SERVICE

(71) Applicant: LightVision Inc., Seoul (KR)

(72) Inventors: Jin Ha Jeong, Yongin-si (KR); Moon Soo Ra, Bucheon-si (KR); Hea Yun Lee, Suwon-si (KR)

(73) Assignee: LightVision Inc., Seoul (KR)

( * ) Notice: Subject to any disclaimer, the term of this patent is extended or adjusted under 35 U.S.C. 154(b) by 144 days.

(21) Appl. No.: 18/518,544

(22) Filed: Nov. 23, 2023

(65) Prior Publication Data

US 2024/0087457 A1 Mar. 14, 2024

Related U.S. Application Data

(63) Continuation of application No. PCT/KR2022/007097, filed on May 18, 2022.

(30) Foreign Application Priority Data

May 31, 2021 (KR) ........................ 10-2021-0070232

(51) Int. Cl.
*G08G 1/14* (2006.01)
*G08G 1/017* (2006.01)
*G08G 1/04* (2006.01)

(52) U.S. Cl.
CPC ............. *G08G 1/148* (2013.01); *G08G 1/017* (2013.01); *G08G 1/04* (2013.01); *G08G 1/141* (2013.01);
(Continued)

(58) Field of Classification Search
CPC .......... G08G 1/148; G08G 1/017; G08G 1/04; G08G 1/141; G08G 1/146; G06Q 2240/00;
(Continued)

(56) References Cited

U.S. PATENT DOCUMENTS

2013/0113936 A1* 5/2013 Cohen ...................... H04N 7/18 382/104
2017/0109942 A1* 4/2017 Zivkovic ............ G06Q 20/3278
(Continued)

FOREIGN PATENT DOCUMENTS

CN 110910655 A 3/2020
CN 111784857 A 10/2020
(Continued)

OTHER PUBLICATIONS

KR20170012714.translate (Year: 2017).*
(Continued)

*Primary Examiner* — B M M Hannan

(57) ABSTRACT

A method of providing a parking service comprises calculating overlap degree of a target vehicle and specific parking area by analyzing a parking monitoring image obtained from a sensor for monitoring specific parking area at a first time of point and determining through the calculated overlap degree whether the target vehicle is parked; recording the target vehicle in an exit queue when the target vehicle goes out of the specific parking area by analyzing a parking monitoring image obtained from the sensor at a second time of point; performing an exit process when the target vehicle included in the exit queue moves to go out of the specific parking area by analyzing a parking monitoring image obtained from the sensor at a third time of point. A payment process in accordance with an exit of the target vehicle is performed based on payment information preregistered when the target vehicle is parked.

9 Claims, 10 Drawing Sheets

(52) U.S. Cl.
CPC ......... *G08G 1/146* (2013.01); *G06Q 2240/00* (2013.01)

(58) Field of Classification Search
CPC .... G06Q 10/02; G06Q 30/0284; G06Q 50/50; G06Q 50/40; G06V 20/62; G06V 20/52; G06N 3/08; G06N 20/00; G07B 15/02; G06T 7/70
See application file for complete search history.

(56) References Cited

U.S. PATENT DOCUMENTS

| | | | | |
|---|---|---|---|---|
| 2020/0180625 | A1* | 6/2020 | Takhirov | B60W 30/1819 |
| 2021/0005083 | A1* | 1/2021 | Khurana | G08G 1/0175 |
| 2021/0074159 | A1 | 3/2021 | Seo | |

FOREIGN PATENT DOCUMENTS

| | | | |
|---|---|---|---|
| JP | 2001-084418 | A | 3/2001 |
| JP | 2020-013293 | A | 1/2020 |
| JP | 2020-098415 | A | 6/2020 |
| KR | 10-2014-0100083 | A | 8/2014 |
| KR | 10-2015-0024494 | A | 3/2015 |
| KR | 10-2018-0068247 | A | 6/2018 |
| KR | 10-2108383 | B1 | 4/2020 |
| KR | 10-2020-0126764 | A | 11/2020 |
| WO | 2018-025381 | A1 | 2/2018 |

OTHER PUBLICATIONS

KR102108383.translate (Year: 2020).*
International Search Report of PCT/KR2022/007097, dated Aug. 26, 2022.
Written Opinion of the International Searching Authoriity of PCT/KR2022/007097, dated Aug. 26, 2022.

* cited by examiner

METHOD AND SYSTEM FOR PROVIDING PARKING SERVICE

CROSS-REFERENCE TO RELATED APPLICATIONS

This application is a continuation of pending PCT International Application No. PCT/KR2022/007097, which was filed on May 18, 2022, and which claims priority under 35 U.S.C 119(a) to Korean Patent Application No. 10-2021-0070232 filed with the Korean Intellectual Property Office on May 31, 2021. The disclosures of the above patent applications are incorporated herein by reference in their entirety.

TECHNICAL FIELD

The disclosure relates to a method and a system for providing a parking service.

BACKGROUND ART

A user using a parking area of a parking lot generally pays parking fee to a parking service provider by a parking duration when he goes out the parking lot. The parking service provider installs a parking barrier including a recognition function of a vehicle number at an entrance of the parking lot and charges the parking fee based on difference of an entrance time and an exit time of the vehicle or charges the parking fee based on entrance information and exit information provided manually by the user through a telephone, an application or a website. In this case, the user should reserve a parking service with a predicted parking time irrespective of real parking time and prepay the parking fee.

In case of a parking lot at which an entrance barrier and an exit barrier are not installed, the parking service provider should charge the parking fee depending on entrance information and exit information provided by the user's action. In this case, it is difficult to get the change when the real parking time is smaller than the time of the prepaid parking fee and it is impossible to extend a parking time if other person reserves corresponding parking area.

Accordingly, the disclosure provides a system for providing a parking service manageable a parking without recognition of the vehicle number. The system may detect automatically an exit of a vehicle by tracking the vehicle based on artificial intelligence by using an image obtained from a sensor installed at the parking lot and receive automatically the parking fee by real parking time when the vehicle is exited though the vehicle number is not recognized, or it is impossible to recognize the vehicle number.

SUMMARY

The disclosure is to provide a method and a system for providing a parking service realizable convenient payment function though a vehicle number is not recognized or fails the recognition of the vehicle number.

Additionally, the disclosure is to provide a method and a system for providing a parking service which detect and track a vehicle based on an artificial intelligence by using an image obtained from a sensor installed at a parking lot, automatically discriminate an exit of a vehicle from a parking area through the detecting and the tracking and realize automatic payment by using the discriminated result.

Furthermore, the disclosure is to provide a method and a system for providing a parking service which calculates accurately an exit time of the vehicle from the parking area based on AI and charge the parking fee depending on the calculated result.

A method of providing a parking service according to an embodiment of the disclosure includes calculating overlap degree of a target vehicle and specific parking area by analyzing a parking monitoring image obtained from a sensor for monitoring specific parking monitoring area of a parking lot at a first time of point and determining through the calculated overlap degree whether the target vehicle is parked; recording the target vehicle in an exit queue when it is determined that the target vehicle goes out of the specific parking area by analyzing a parking monitoring image obtained from the sensor at a second time of point; performing an exit process when it is detected that the target vehicle included in the exit queue moves to go out of the specific parking monitoring area by analyzing a parking monitoring image obtained from the sensor at a third time of point. Here, a payment process in accordance with an exit of the target vehicle is performed based on payment information preregistered when the target vehicle is parked.

A method of providing a parking service according to another embodiment of the disclosure includes (a) calculating overlap degree of a target vehicle and specific parking area by analyzing a parking monitoring image obtained from a first sensor for monitoring a first parking monitoring area of a parking lot at a first time of point and determining through the calculated overlap degree whether the target vehicle is parked; (b) recording the target vehicle in an exit queue when it is detected that the target vehicle parked in the specific parking area moves by analyzing a parking monitoring image obtained from the first sensor at a second time of point; and (c) matching a vehicle detected by analyzing a parking monitoring image obtained from a second sensor for monitoring a second parking monitoring area of the parking lot at a third time of point with the target vehicle when the detected vehicle is identical to the target vehicle included in the exit queue and performing an exit process. Here, a payment process in accordance with an exit of the target vehicle is performed based on payment information preregistered when the target vehicle is parked.

The overlap degree is calculated by using an area of the target vehicle and an area of the specific parking area, the overlap degree being calculated by dividing an overlap area of the target vehicle and the specific parking area by sum of the area of the target vehicle and the area of the specific parking area, in the step of (a), it is determined that the target vehicle is parked in the specific parking area when the overlap degree is included in a reference range.

The method further includes before the step of (b), performing first prepayment process by basic parking fee by obtaining device information, vehicle information and payment information from a user device after transmitting an entrance guide message to the user device, when a unique number of the specific parking area in accordance with recognition of an electronic code mapped with the specific parking area is received from the user device according as the target vehicle is parked in the specific parking area; and updating a parking state table depending on the parking of the target vehicle in the specific parking area when the first prepayment process is completed.

The parking state table includes parking state of parking areas and information related to vehicles, and the method further includes transmitting an illegal parking checking request message to a manager device when it is detected that a vehicle not registered in the parking state table is parked in corresponding parking area by analyzing a parking monitoring area obtained through a sensor for monitoring the parking lot.

The step of performing the payment process includes performing the payment process considering money of the first prepayment process with reference to the parking state table and updating the parking state table to change state of the specific parking area into no parking.

The step of (c) includes generating a feature vector by applying appearance of the detected vehicle to a machine learning algorithm or a deep learning algorithm and discriminating through the generated feature vector whether the detected vehicle and the target vehicle included in the exit queue are the same vehicle.

The feature vector includes at least one of a global feature based on appearance of the detected vehicle and a local feature.

In another aspect, a system for using a parking service when a sensor fails recognition of a vehicle number, or no sensor exists and performing automatic payment when the vehicle is exited is provided.

A server according to an embodiment of the disclosure includes a communication unit; a memory configured to store at least one command; a processor configured to execute the command stored in the memory. Here, the command executed by the processor includes: calculating overlap degree of a target vehicle and specific parking area by analyzing a parking monitoring image obtained from a sensor for monitoring specific parking monitoring area of a parking lot at a first time of point and determining through the calculated overlap degree whether the target vehicle is parked; recording the target vehicle in an exit queue when it is determined that the target vehicle goes out of the specific parking area by analyzing a parking monitoring image obtained from the sensor at a second time of point; performing an exit process when it is detected that the target vehicle included in the exit queue moves to go out of the specific parking monitoring area by analyzing a parking monitoring image obtained from the sensor at a third time of point. Here, a payment process in accordance with an exit of the target vehicle is performed based on payment information preregistered when the target vehicle is parked.

A server according to another embodiment of the disclosure includes a communication unit; a memory configured to store at least one command; and a processor configured to execute the command stored in the memory. Here, the command executed by the processor includes (a) calculating overlap degree of a target vehicle and specific parking area by analyzing a parking monitoring image obtained from a first sensor for monitoring a first parking monitoring area of a parking lot at a first time of point through the communication unit and determining through the calculated overlap degree whether the target vehicle is parked; (b) recording the target vehicle in an exit queue when it is determined that the target vehicle parked in the specific parking area moves by analyzing a parking monitoring image obtained from the first sensor at a second time of point through the communication unit; and (c) matching a vehicle detected by analyzing a parking monitoring image obtained from a second sensor for monitoring a second parking monitoring area of the parking lot at a third time of point through the communication unit with the target vehicle when the detected vehicle is identical to the target vehicle included in the exit queue and performing an exit process. Here, a payment process in accordance with an exit of the target vehicle is performed based on payment information preregistered when the target vehicle is parked.

A system according to still another embodiment of the disclosure includes a sensor configured to monitor a parking monitoring area of a parking lot; and a server configured to determine that a vehicle is exited when the vehicle moves to go out of the parking monitoring area after it is detected that the vehicle in a parking area moves by analyzing a parking monitoring image obtained from the sensor and perform a payment process in accordance with an exit of a vehicle based on preregistered payment information when it is determined that the vehicle is exited.

A system according to still another embodiment of the disclosure includes a first sensor configured to monitor a first parking monitoring area of a parking lot; a second sensor configured to monitor a second parking monitoring area of the parking lot; and a server configured to determine that a vehicle is exited when the vehicle is detected by analyzing the second parking monitoring image obtained from the second sensor after it is detected that the vehicle in a parking area moves by analyzing the first parking monitoring image obtained from the first sensor and perform a payment process in accordance with an exit of a vehicle based on preregistered payment information when it is determined that the vehicle is exited.

A method and a system for providing a parking service according to an embodiment of the disclosure may provide the parking service for managing a parking without recognition of a vehicle number.

The method and the system of the disclosure detect, and track of the vehicle based on AI by using an image obtained from a sensor installed at the parking lot to detect automatically an exit of the vehicle from a parking area and realize automatic payment by real parking time when the vehicle goes out though a vehicle number is not recognized or it is impossible to recognize the vehicle number.

The method and the system of the disclosure may charge a parking fee by calculating accurately an exit time of the vehicle on the parking area based on AI.

BRIEF DESCRIPTION OF DRAWINGS

Example embodiments of the present disclosure will become more apparent by describing in detail example embodiments of the present disclosure with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

Hereinafter, embodiment of the disclosure will be described in detail with reference to accompanying drawings.

Figure 1:
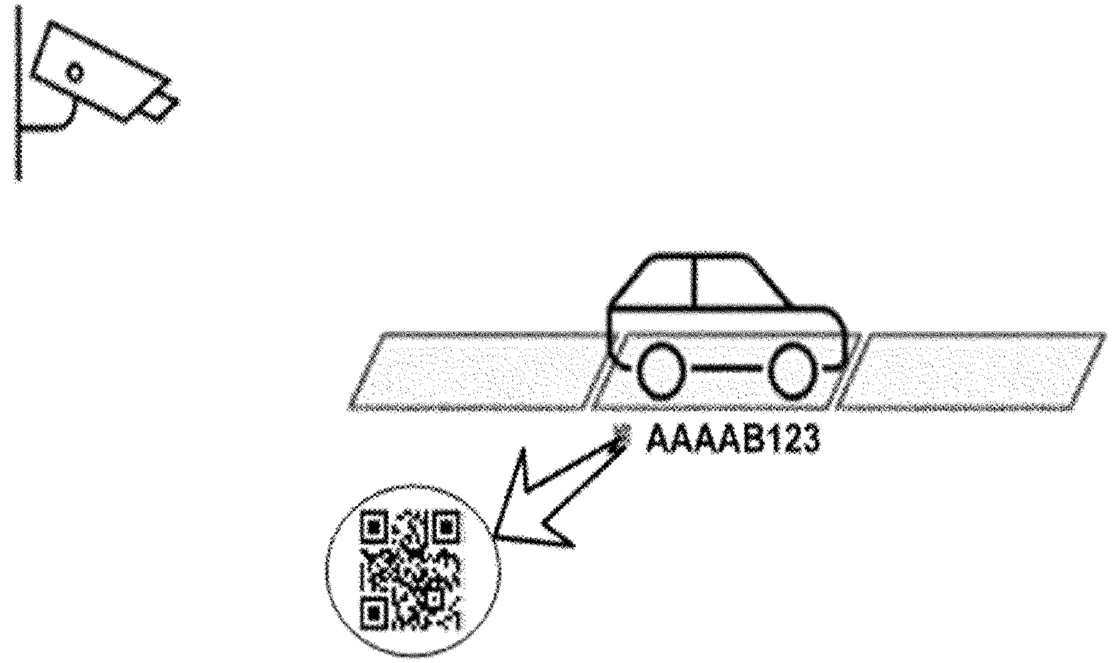
FIG. 1 is a view illustrating a parking service according to an embodiment of the disclosure.

FIG. 1 is a view illustrating a parking service according to an embodiment of the disclosure.

The parking service of the disclosure is performed for a road parking lot formed on a backside road, etc. or an off-street parking lot. The parking service may be used for a parking lot which a parking barrier for an entrance and an exit of the parking lot is not installed, unlike conventional public parking lot.

FIG. 1 shows an example of a parking lot on the backside road. It is assumed that a parking barrier is not equipped in the parking lot as shown in FIG. 1, a parking space (parking area) is formed on a road, and no people or few people manage the parking lot.

The parking areas are formed in a row in FIG. 1, but the parking areas are not limited as in FIG. 1. The design of the parking areas may be variously modified depending on the situation of the road.

A system for providing a parking service of the disclosure may monitor areas (hereinafter, referred to as "a parking monitoring area") of the parking lot in real time by using a sensor, detect vehicles by analyzing images (hereinafter, referred to as "a parking monitoring image") obtained through each of the sensors, and give respectively an identification information ID to the detected vehicles. Additionally, the system may determine whether the vehicle parks in specific parking space (parking area) by analyzing the parking monitoring image and determine whether the vehicles go out by detecting moving of the vehicle parked in the specific parking space (parking area).

In an embodiment, the system for providing the parking service may recognize a vehicle number through analysis of the parking monitoring image obtained by the sensor. If the vehicle number is not recognized or a sensor does not exist in corresponding region, the system may give temporary identification information to the detected vehicle and manage the parking or the exit or payment process, etc. based on the given temporary identification information.

It is impossible to track the vehicle because it is recognized as different vehicles though the vehicles in the images are the same vehicle if different identification information is given to the vehicle in each image. Accordingly, the system for providing the parking service may give the same identification information to the same vehicle, and thus the vehicle can be tracked though the vehicle number is not recognized.

A process of matching the identification information of the vehicle (re-identification or re-id) includes a step of detecting location of the vehicle by analyzing an image obtained by each of the sensors and a step of giving the same identification information to the same vehicle by reconstructing appearance information of the detected vehicle to a feature vector through a machine learning or a deep learning, thereby matching the identification information. Here, the appearance information may include both global and local features. The global feature means feature shared by the same model of vehicles, e.g., appearance or color of the vehicle, etc. The local feature indicates detailed features of the vehicle, e.g., unique scratch of the vehicle or a sticker adhered to a glass, etc. The system for providing the parking service may compare feature vectors of the vehicles obtained by different cameras, determines that the vehicles are the same vehicle when the feature vectors are similar, and determines that the vehicles are different when the feature vectors are not similar. The similarity of two feature vectors may be calculated by using e.g., a Euclidean distance. The method of calculating the similarity may depend on the machine learning or the deep learning used when the feature vector is calculated.

The system for providing the parking service according to disclosure will be precisely described below.

Figure 2:
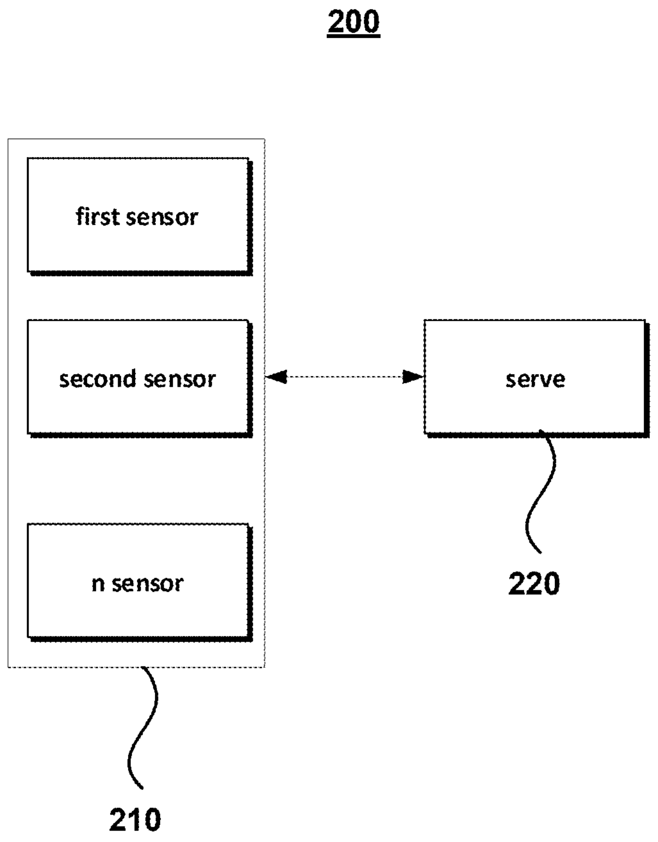
FIG. 2 is a view schematically illustrating a system for providing a parking service according to an embodiment of the disclosure.

FIG. 2 is a view illustrating schematically a system for providing a parking service according to an embodiment of the disclosure.

In FIG. 2, a system 200 of providing a parking service of the present embodiment includes at least one sensor 210 and a server 220.

A sensor 210 monitors a partial area (hereinafter, referred to as "parking monitoring area") of a parking lot in real time.

The sensor 210 may obtain a parking monitoring image by monitoring corresponding parking monitoring area of the parking lot in real time.

For example, the sensor 210 may be an image photographing device, e.g., a CCTV installed at the parking lot or vicinity of the parking lot.

The parking monitoring area monitored by the sensor 210 may include plural parking areas, and information concerning the parking areas may be pre-stored in the server 220.

The server 220 provides the parking service by using the parking monitoring image transmitted from the sensor 210.

The server 220 may detect a vehicle object without recognizing a vehicle number by analyzing the parking monitoring image transmitted from the sensor 210, detect specific parking area in which the vehicle parks through the detecting of the vehicle object, and then discriminate whether the vehicle parks, discriminate whether the vehicle is exited and perform a payment process, etc. according to the parking. This will be described in detail below.

Figure 3:
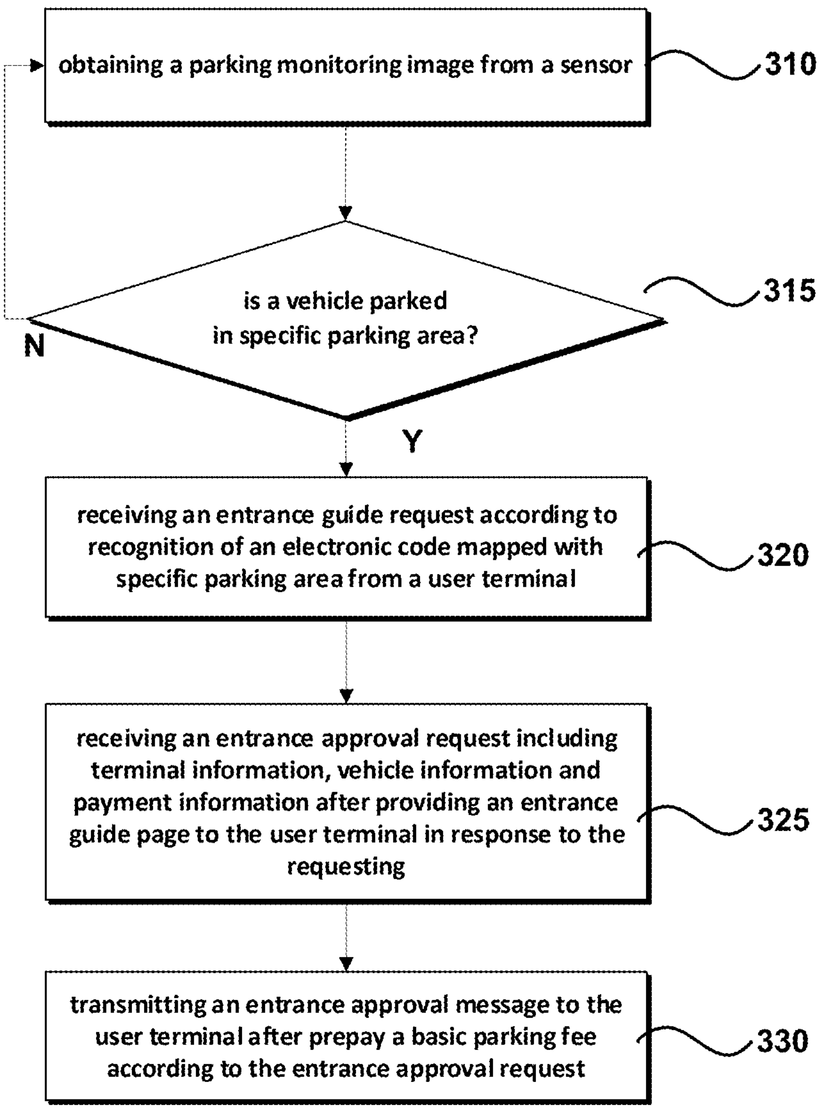
FIG. 3 is a flowchart illustrating a process of providing a parking service when a vehicle enters a parking lot according to an embodiment of the disclosure.
Figure 4:
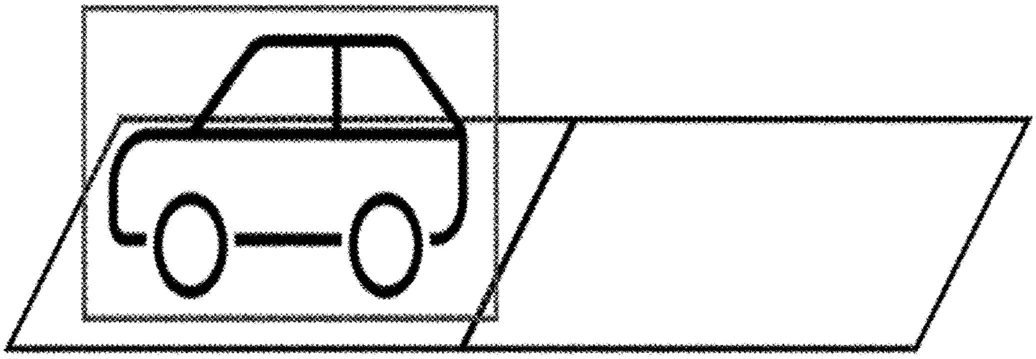
FIG. 4 and FIG. 5 are views illustrating blocking of a parking area by a vehicle according to an embodiment of the disclosure.
Figure 5:
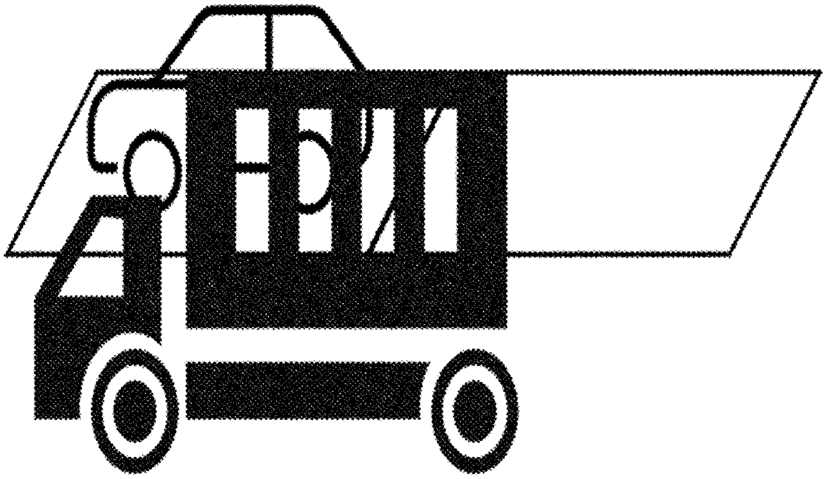

FIG. 3 is a flowchart illustrating a process of providing a parking service when a vehicle enters a parking lot according to an embodiment of the disclosure, and FIG. 4 and FIG. 5 are views illustrating blocking of a parking area by a vehicle according to an embodiment of the disclosure.

In a step of 310, the server 220 obtains a parking monitoring image from the sensor. The server 220 may obtain by one time the parking monitoring image from the sensor but obtain periodically the parking monitoring image from the sensor. That is, the server 220 may discriminate parking, moving or an exit of the vehicle, etc. by using the parking monitoring images obtained from the sensor at different time. Accordingly, hereinafter, it will be interpreted that the parking monitoring image used for discriminating the parking, the moving or the exit of the vehicle is obtained from a sensor or plural sensors at different time, though no description is mentioned.

In a step of 315, the server 220 discriminates whether the vehicle parks in specific parking area by analyzing the parking monitoring image obtained from the sensor.

For example, the server 220 gives an identification information ID to the vehicle when the vehicle is detected by analyzing the parking monitoring image obtained by the sensor. Additionally, the server 220 detects an area of the vehicle detected by analyzing the parking monitoring image obtained from the sensor. It is assumed that the area of each of the parking areas and coordinate information of each of the parking areas is prestored in the server 220.

The server 220 may calculate information concerning overlap of the vehicle and the specific parking area by using the area of the detected vehicle and the area of the parking area and discriminate whether the vehicle parks in the specific parking area by using the calculated result.

For example, the server 220 may calculate overlap degree by dividing an overlapped area (hereinafter, referred to as “overlap area”) of the detected vehicle and the specific parking area by sum of the area of the detected vehicle and the area of the specific parking area when the detected vehicle locates in the specific parking area.

The server 220 may determine that the vehicle parks in the specific parking area when the calculated overlap degree is included in a reference range. However, the server 220 may determine that the vehicle does not park in the specific parking area when the calculated overlap degree is beyond the reference range.

FIG. 4 shows a case that the vehicle parks normally in the specific parking area, and FIG. 5 illustrates a case where the specific parking area is blocked by another vehicle. If a vehicle is located in front of the specific parking area not in the specific parking area as shown in FIG. 5, the overlap area of the vehicle and the specific parking area increases and thus it becomes higher than preset reference range. In this case, the server 220 determines that the vehicle isn’t parked normally in the specific parking area, and it may request crackdown to a device of a manager when the vehicle is continuously parking in front of the specific parking area more than predetermined time.

The step of 310 is performed when the vehicle is not parked in the specific parking area.

In a step of 320, the server 220 receives an entrance guide request in accordance with an electronic code mapped with the specific parking area from a user device corresponding to the detected vehicle when it is determined that the vehicle is parked in the specific parking area. Here, the entrance guide request may include a unique number for the specific parking area obtained from the electronic code.

In the above description, it is described based on recognition of the electronic code. However, the user may request parking guide by inputting directly a unique number shown in the parking area in a website or an application through the user device.

In a step of 325, the server 220 provides an entrance guide page to the user device in response to the request, and it receives an entrance approval request including information, e.g., phone number, etc. of the user device, information of the vehicle and payment information.

In a step of 330, the server 220 processes prepayment by basic parking fee, e.g., preset amount of money in response to the entrance approval request, and then it transmits an entrance approval message to the user device.

Subsequently, the server 220 may change current state of the specific parking area to “parking” by updating a parking state table. The parking state table records the parking state of parking areas. The parking state may include information as to whether a vehicle is parked in the corresponding parking area, information of the vehicle, information of the user device, a parking start time, etc.

Figure 6:
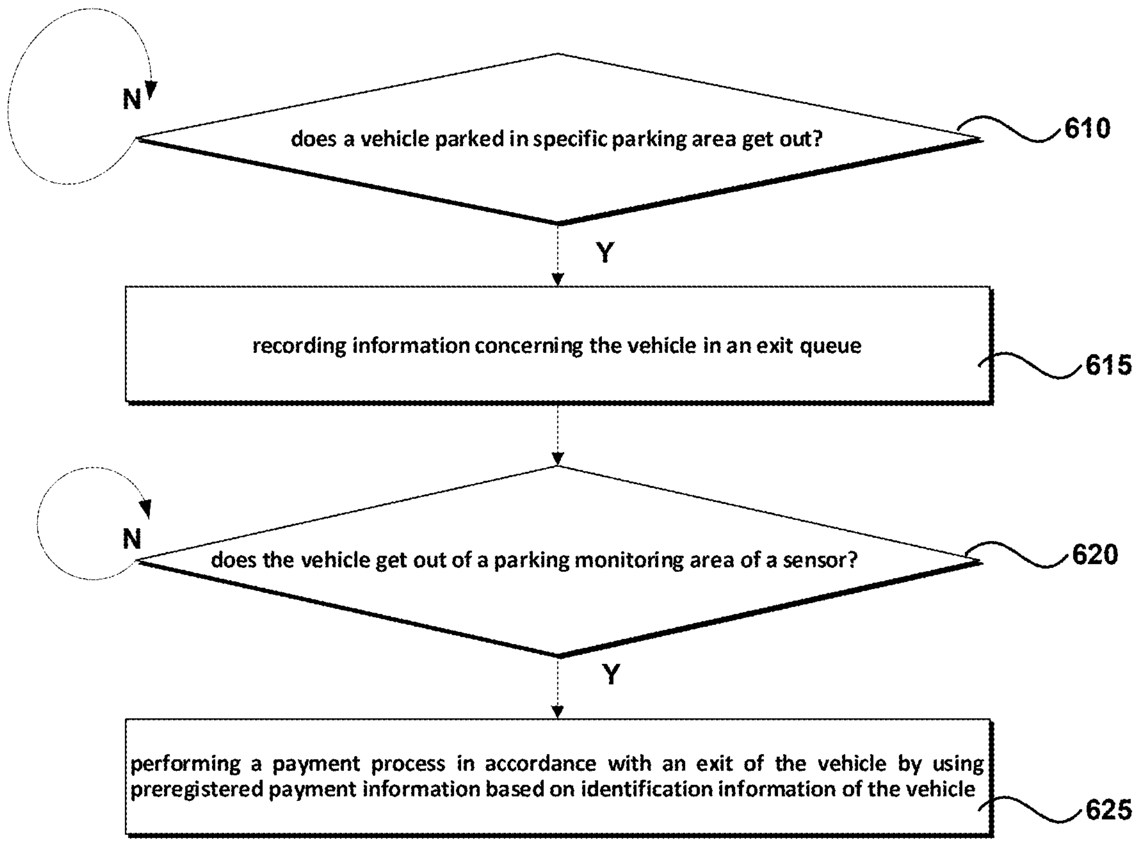
FIG. 6 is a flowchart illustrating a process of providing a parking service when a vehicle goes out according to an embodiment of the disclosure.
Figure 7:
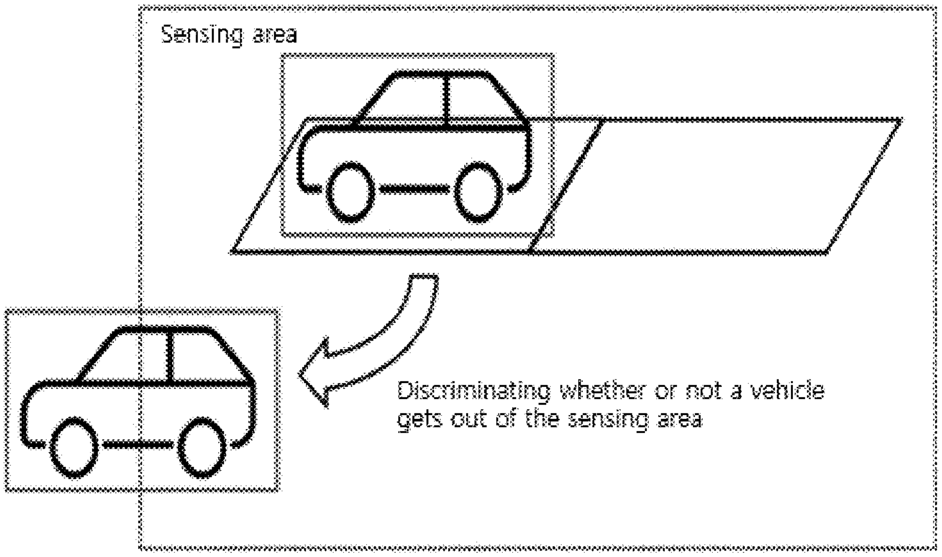
FIG. 7 is a view describing an exit of the vehicle according to an embodiment of the disclosure.

FIG. 6 is a flowchart illustrating a process of providing a parking service when a vehicle goes out according to an embodiment of the disclosure, and FIG. 7 is a view describing an exit of the vehicle according to an embodiment of the disclosure. Hereinafter, a method of providing the parking service in accordance with the exit of the vehicle when it is detected by the sensor that the vehicle parked in the parking area moves will be described in detail.

In a step of 610, the server 220 discriminates whether the vehicle parked in the specific parking area goes out by analyzing the parking monitoring image obtained from the sensor at any time of point.

The step of 610 is performed when the vehicle does not go out.

In a step of 615, the server 220 records information related to the vehicle parked in the specific parking area in an exit queue when the vehicle goes out of the specific parking area. Here, the information related to the vehicle may include identification information given to a vehicle object and the vehicle.

In a step of 620, the server 220 discriminates whether the vehicle goes out of a sensing area of the sensor by analyzing the parking monitoring image obtained from the sensor after any time of point.

For example, the server 220 may determine that the vehicle goes out of the sensing area (monitoring area) of corresponding sensor when the vehicle exited from the parking area is not detected in the parking monitoring image obtained from corresponding sensor by analyzing continually the parking monitoring images obtained periodically from the sensor.

The step of 620 is performed when it is determined that the vehicle does not go out of the sensing area of the sensor.

In a step of S625, the server 220 performs a payment process for exit of the vehicle by using preregistered payment information based on the identification information of the vehicle when it is determined that the vehicle goes out of the sensing area of the sensor.

Figure 8:
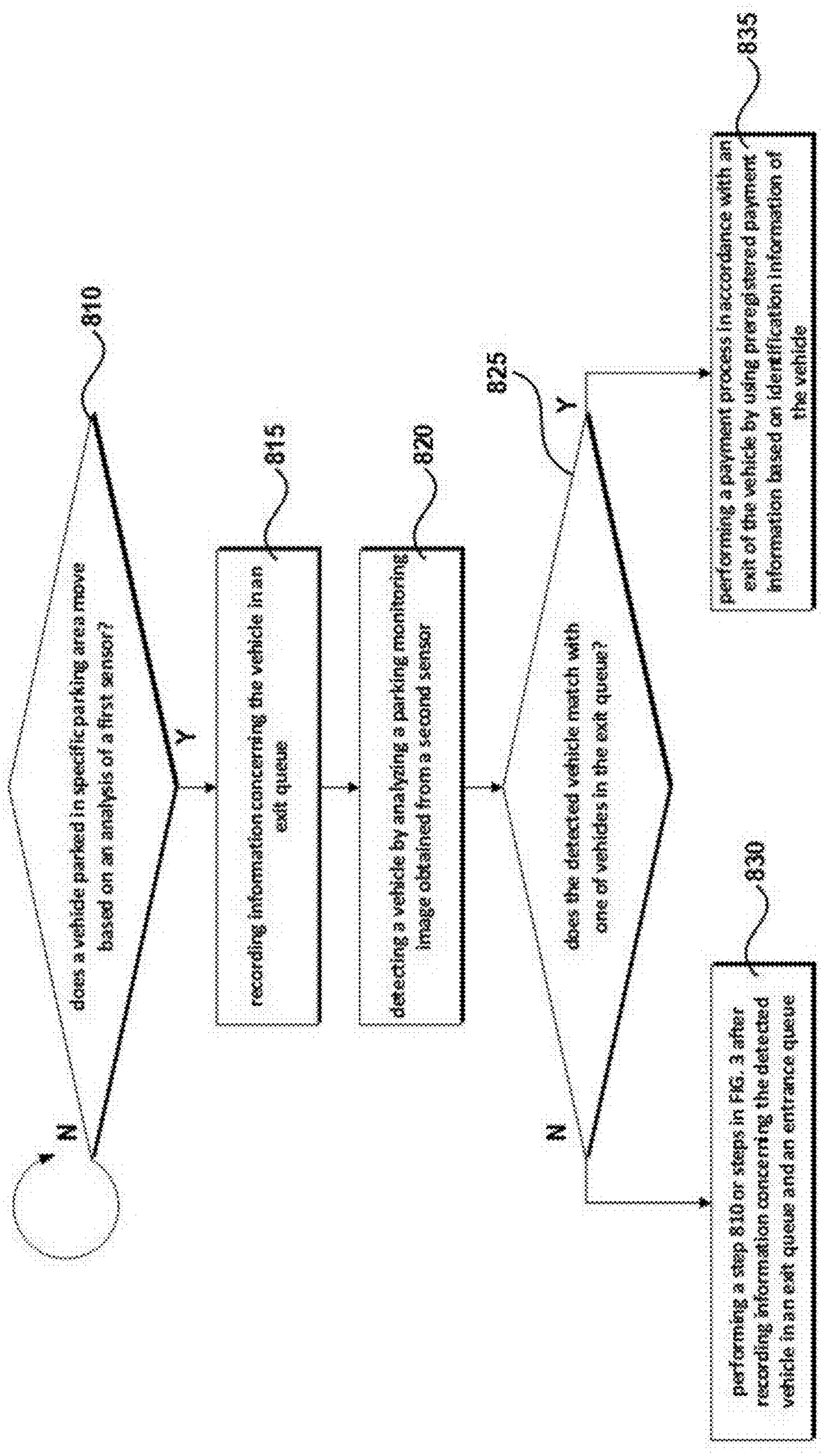
FIG. 8 is a flowchart illustrating a process of providing a parking service in accordance with exit of the vehicle according to another embodiment of the disclosure.
Figure 9:
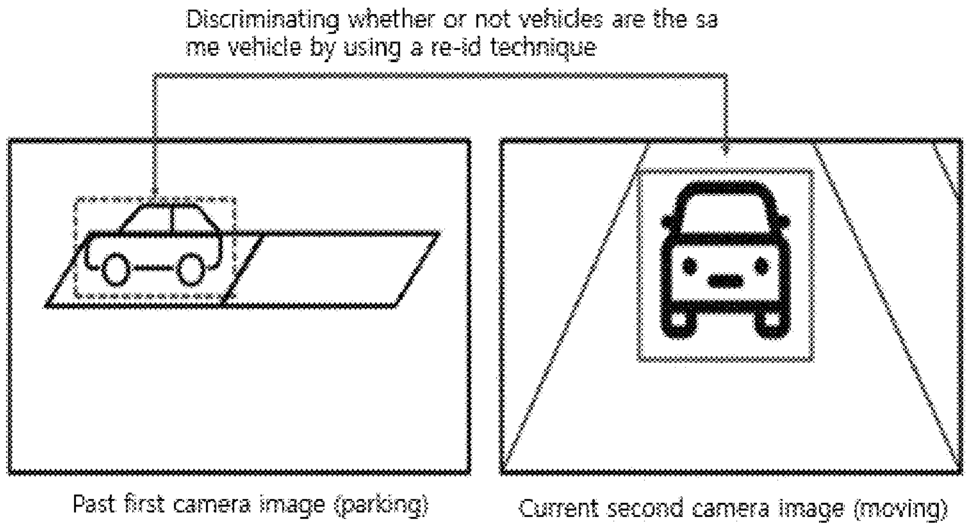
FIG. 9 is a view describing a process of matching identification number of a vehicle (re-id) according to an embodiment of the disclosure.

FIG. 8 is a flowchart illustrating a process of providing a parking service in accordance with exit of the vehicle according to another embodiment of the disclosure, and FIG. 9 is a view describing a process of matching identification number of a vehicle (re-identification or re-id) according to an embodiment of the disclosure. Hereinafter, it is assumed that the vehicle moves to exit from specific parking area as described in FIG. 3.

A system of providing a parking service according to another embodiment of the disclosure may perform an exit process when it is detected that a vehicle moves by at least two sensors. It is assumed that a first sensor monitors the specific parking area in which the vehicle is parked, and a second sensor monitors another area.

In a step of 810, the server 220 discriminates whether the vehicle parked in the specific parking area moves by analyzing a parking monitoring area obtained from the first sensor.

The step of 810 is performed when the vehicle does not move.

In a step of 815, the server 220 records information related to the vehicle in an exit queue when the vehicle moves. Here, the information related to the vehicle may include identification information given to a vehicle object and the vehicle.

In a step of 820, the server 220 detects the vehicle by analyzing a parking monitoring image obtained from the second sensor for monitoring another parking monitoring area of a parking lot.

In an embodiment, the system for providing the parking service provides an unmanned parking managing service by using sensors for monitoring different parking areas. Accordingly, the server 220 may give identification information to vehicles after detecting the vehicles from parking monitoring images obtained from the sensors, and it may track the vehicle by using the given identification information. However, different identification information may be given to the vehicles detected from the parking monitoring images obtained by different sensors. As a result, different identification information may be given to the same vehicle though the vehicles are the same vehicle in the event that the same vehicle is sensed by different sensors due to moving of the vehicle.

Accordingly, the system may discriminate whether the vehicles detected from the parking monitoring images obtained from the sensors are the same vehicle and perform in advance a process of matching identification information depending on the discriminated result. This will be described in detail with reference to accompanying drawing FIG. 9.

As shown in FIG. 9, the vehicle is sensed by the second sensor when the vehicle parked in a parking area moves for exit, the parking in the parking area being sensed by the first sensor. In this case, it is difficult to track the vehicle because different identification information is given to the vehicles sensed by the sensors.

Accordingly, the system may discriminate whether vehicles detected from parking monitoring images obtained from different sensors in a certain time are the same vehicle and match identification information of the vehicles according to the discriminated result.

In a step of 825, the server 220 discriminates whether the vehicle detected from the parking monitoring image obtained from the second sensor is matched with one of vehicles included in the exit queue.

In a step of 830, the server 220 records information related to the detected vehicle in the entrance queue or the exit queue when the detected vehicle is not matched with the vehicles included in the exit queue. That is, the server 220 may discriminate that the detected vehicle moves for the exit or moves to the parking lot for the purpose of the entrance. Subsequently, an exit process or an entrance process may be performed when the same vehicle is detected through the parking monitoring image obtained from another sensor.

In a step of 835, the server 220 performs the payment process for the exit by using the preregistered payment information based on the identification information of the vehicle when the detected vehicle is matched with one of the vehicles included in the exit queue. Then, the server 220 may change state of a parking area in which the vehicle is parked to "no parking" by updating a parking state table.

Figure 10:
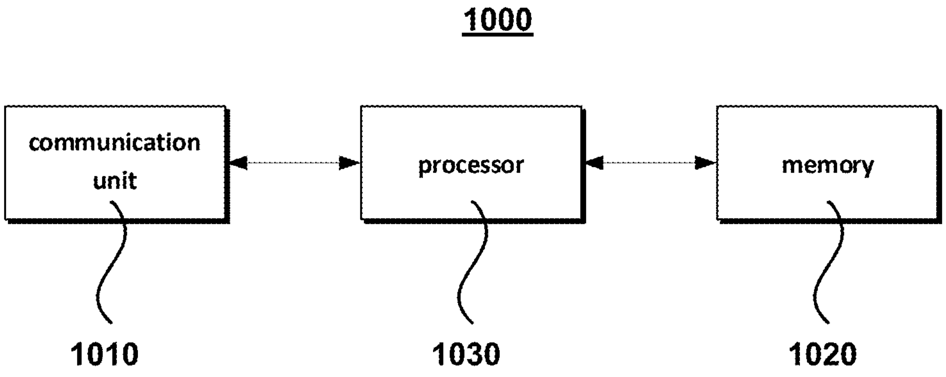
FIG. 10 is a block diagram schematically illustrating a server according to an embodiment of the disclosure.

FIG. 10 is a block diagram schematically illustrating a server according to an embodiment of the disclosure.

In FIG. 10, the server 220 includes a communication unit 1010, a memory 1020 and a processor 1030.

The communication unit 1010 transmits data to another device, e.g. at least one sensor 210, a user device or a manager device or receives data from another device through a communication network.

The memory 1020 stores commands needed for performing the method of providing the parking service which performs a parking management without recognizing a vehicle number.

The processor 1030 controls elements of the server 220, e.g., the communication unit 1010 and the memory 1020, etc.

Additionally, the processor 1030 may execute the commands stored in the memory 1020, and the commands may execute the method of providing the parking service as shown in FIG. 3 to FIG. 9.

Repeated description will be omitted because this is described in the above embodiments.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc.

The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

What is claimed is:

1. A method for providing a parking service, the method comprising:

calculating an overlap degree of a target vehicle and a specific parking area by analyzing a parking monitoring image obtained from a sensor at a first time and determining whether the target vehicle is parked based on the calculated overlap degree;

recording the target vehicle in an exit queue when analysis of a parking monitoring image, obtained from a sensor at a second time, indicates that the target vehicle is departing the specific parking area;

performing an exit process when analysis of a parking monitoring image, obtained from a sensor at a third time, detects that the target vehicle in the exit queue is moving to leave the specific parking area;

generating a feature vector by applying appearance of the detected vehicle to a machine learning algorithm or a deep learning algorithm, and using the generated feature vector to discriminate whether the detected vehicle and the target vehicle included in the exit queue are the same vehicle; and performing a payment process in accordance with an exit of the target vehicle based on payment information pre-registered when the target vehicle is parked, wherein the feature vector includes at least one of a global feature based on appearance of the detected vehicle and a local feature.

2. The method of claim 1, further comprising:

matching a vehicle detected in a second parking monitoring area, by analyzing an image from a second sensor at a fourth time, with the target vehicle in the exit queue, and performing the exit process if the vehicles are identical.

3. The method of claim 1, wherein the overlap degree is calculated by using an area of the target vehicle and an area of the specific parking area, the overlap degree being calculated by dividing an overlap area of the target vehicle and the specific parking area by sum of the area of the target vehicle and the area of the specific parking area, wherein it is determined that the target vehicle is parked in the specific parking area when the overlap degree is included in a reference range.

4. The method of claim 3, further comprising:

performing first prepayment process by basic parking fee by obtaining device information, vehicle information and payment information from a user device after transmitting an entrance guide message to the user device, when a unique number of the specific parking area in accordance with recognition of an electronic code mapped with the specific parking area is received from the user device according as the target vehicle is parked in the specific parking area; and updating a parking state table depending on the parking of the target vehicle in the specific parking area when the first prepayment process is completed.

5. The method of claim 4, wherein the parking state table includes parking state of parking areas and information related to vehicles, and the method further comprising:

transmitting an illegal parking checking request message to a manager device when it is detected that a vehicle not registered in the parking state table is parked in corresponding parking area by analyzing a parking monitoring area obtained through a sensor for monitoring the parking lot.

6. The method of claim 5, wherein the step of performing the payment process includes performing the payment process considering money of the first prepayment process with reference to the parking state table and updating the parking state table to change state of the specific parking area into no parking.

7. A non-transitory computer-readable recording medium storing instructions that, when executed by at least one processor, cause the at least one processor to perform a method for providing a parking service, the method comprising:

obtaining a parking monitoring image from a sensor monitoring a parking area of a parking lot;

processing the parking monitoring image using the at least one processor to determine whether a target vehicle is parked in a specific parking area, the processing comprising:

calculating an overlap degree of the target vehicle and the specific parking area by analyzing the parking monitoring image obtained from a sensor at a first time and determining whether the target vehicle is parked based on the calculated overlap degree;

recording the target vehicle in an exit queue based on an analysis of a subsequent parking monitoring image indicating that the target vehicle has left the specific parking area;

performing an exit process for the target vehicle from the exit queue based on detecting, from a further subsequent parking monitoring image, that the target vehicle is moving to exit the specific parking area;

generating a feature vector by applying appearance of the detected vehicle to a machine learning algorithm or a deep learning algorithm, and using the generated feature vector to discriminate whether the detected vehicle and the target vehicle included in the exit queue are the same vehicle; and automatically performing a payment process for the exit of the target vehicle based on preregistered payment information associated with the target vehicle when the target vehicle is parked, wherein the feature vector includes at least one of a global feature based on appearance of the detected vehicle and a local feature.

8. A server comprising:

a communication unit;

a memory configured to store at least one command;

a processor configured to execute the command stored in the memory, wherein the command executed by the processor includes:

calculating an overlap degree of a target vehicle and a specific parking area by analyzing a parking monitoring image obtained from a sensor for monitoring the specific parking area of a parking lot at a first time and determining whether the target vehicle is parked based on the calculated overlap degree;

recording the target vehicle in an exit queue when analysis of a parking monitoring image, obtained from a sensor at a second time, indicates that the target vehicle departs the specific parking area;

performing an exit process when analysis of a parking monitoring image, obtained from a sensor at a third time, detects that the target vehicle in the exit queue is moving to leave the specific parking area;

generating a feature vector by applying appearance of the detected vehicle to a machine learning algorithm or a deep learning algorithm, and using the generated feature vector to discriminate whether the detected vehicle and the target vehicle included in the exit queue are the same vehicle; and performing a payment process in accordance with an exit of the target vehicle based on payment information pre-registered when the target vehicle is parked, wherein the feature vector includes at least one of a global feature based on appearance of the detected vehicle and a local feature.

9. The server of claim 8, wherein the command executed by the processor further includes, obtaining a parking monitoring image from a second sensor monitoring a second parking monitoring area via the communication unit at a fourth time;

matching a vehicle detected by analyzing the parking monitoring image obtained from the second sensor with the target vehicle when the detected vehicle is identical to the target vehicle included in the exit queue and performing the exit process based on the matching.

* * * * *